United States Patent Office 3,415,809
Patented Dec. 10, 1968

3,415,809
CATIONIC HETEROCYCLIC DISAZO DYES
John G. Fisher and Clarence A. Coates, Jr., Kingsport, Tenn., assignors to Eastman Kodak Company, Rochester, N.Y., a corporation of New Jersey
No Drawing. Filed Oct. 22, 1965, Ser. No. 502,427
9 Claims. (Cl. 260—158)

ABSTRACT OF THE DISCLOSURE

Azo compounds containing two thiazoly-, benzothiazolyl-, thiadiazolyl-, triazolyl-, or benzimidazolyl-azoaniline groups, the two aniline nitrogen atoms being joined by a group having the formula.

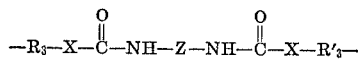

in which $R_3$ and $R'_3$ each is alkylene, X is —O— or —NH—, and Z is alkylene, phenylene, bis(phenylene) methylene, bis(methylene)phenylene, biphenylene or naphthylene, are useful as dyes for polyacrylonitrile textile materials.

---

This invention relates to novel heterocyclic azo compounds and, particularly, to novel cationic heterocyclic azo dyes for synthetic fibers, yarns and fabrics.

The novel cationic heterocyclic azo compounds of the invention are characterized by the general formula

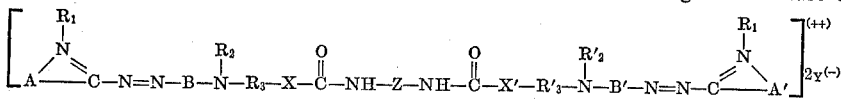

(I)

wherein

A and A′ represent the same or different radical or group of atoms necessary to complete the heterocyclic ring, which ring may be a thiazole ring, a benzothiazole ring,

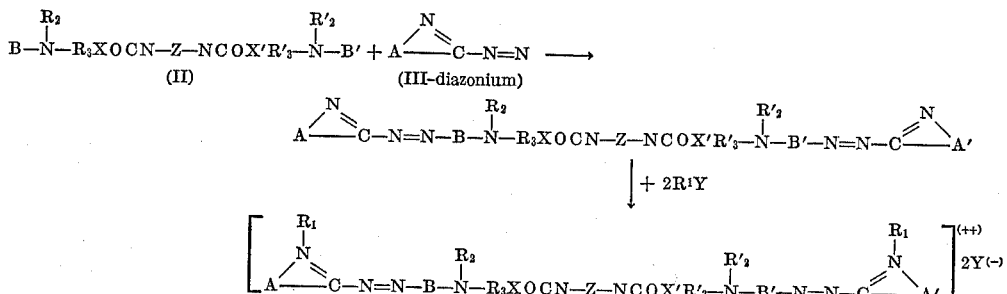

a 1,3,4-thiadiazole ring or a benzimidazole ring and the like;
$R_1$ represents a lower alkyl radical, e.g. methyl; or a benzyl radical;
B and B′ represent the same or different monocyclic carbocyclic aromatic radicals of the benzene series, e.g. phenylene and substituted phenylene such as o,m-tolylene and the like;
$R_2$ and $R'_2$ represent the same or different alkyl radicals, e.g., methyl, ethyl and the like, or the same or different monocyclic carbocyclic aromatic radicals, e.g. phenyl or substituted phenyl such as tolyl;
$R_3$ and $R'_3$ represent a straight- or branched-chain lower alkylene radical, e.g. methylene, ethylene and the like;
X and X′ represent —O— or —NH— and may be the same or different;
Z represents alkylene, e.g. hexamethylene; arylene, e.g. phenylene, p-phenylene, p-xylylene; alkarylene, e.g. methylenebis (phenylene); aralkylene, e.g. tolylene, xylylene or naththylene and the like; and Y represents an anionic material, e.g. $CH_3SO_4^{(-)}$ or

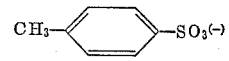

and the like.

The heterocyclic azo dyes of the invention are prepared by two principal methods. The choice of method is dependent on whether the desired dye is to be symmetrical or unsymmetrical.

It is desired that the dye be symmetrical in structure, a bis urea or a bis urethane coupling component having the formula

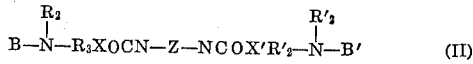

(II)

wherein all symbols are defined above and wherein the prime symbols are the same as the principal symbols, is coupled with two equivalents of the diazonium salt of a heterocyclic compound having the formula

(III)

wherein A is defined above. Thus, the product of the coupling reaction of a compound of Formula II with a compound of Formula III has the nonquaternized structure of Formula I wherein the principal and prime symbols represent the same structures. The coupling reaction is conventional and will be more fully described in the examples set forth hereinafter. Upon obtaining a compound having the structure of Formula I in the nonquaternized

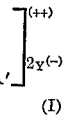

form, the compound is quaternized with an alkylating agent to provide the symmetrical cationic heterocyclic azo dyes of the invention. Thus, the reaction sequence is illustrated as follows:

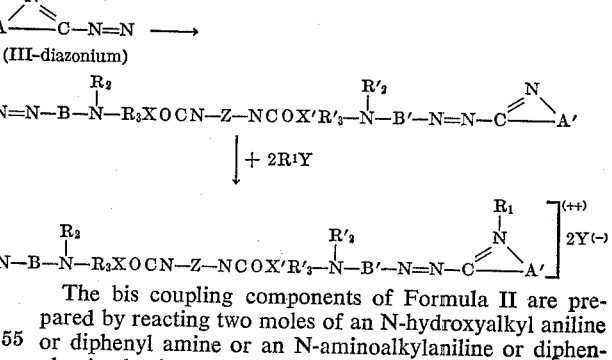

The bis coupling components of Formula II are prepared by reacting two moles of an N-hydroxyalkyl aniline or diphenyl amine or an N-aminoalkylaniline or diphenylamine having the formula

(IV)

wherein the symbols are defined above, with a diisocyanate having the formula

(V)

wherein Z is defined above. When X is oxygen, the bis coupling component will be a urethane and when X is —NH, the bis coupling component will be a urea.

If it is desired that the dye be unsymmetrical in structure, a different method than that described above is used. To prepare the unsymmetrical heterocyclic azo dye, the diazonium salt of a heterocyclic compound having the structure of Formula III is coupled with a compound having free hydroxyl or amino groups of Formula IV.

The monoheterocyclic dye thus prepared has the formula:

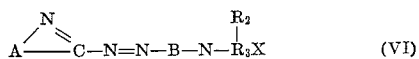 (VI)

wherein the symbols are defined above. By subsequently reacting the dye of Formula VI with a diisocyanate of Formula V, a product is obtained which has the formula

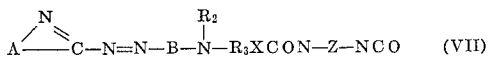 (VII)

Upon reaction of the compound of Formula VII with a second dye having the Formula VI, a dye having the structure

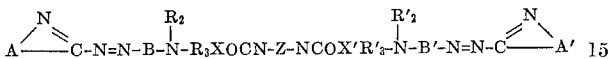

is obtained wherein the heterocyclic end groups have nonidentical structures. Upon alkylation, a compound of Formula I is obtained. The reaction sequence is as follows:

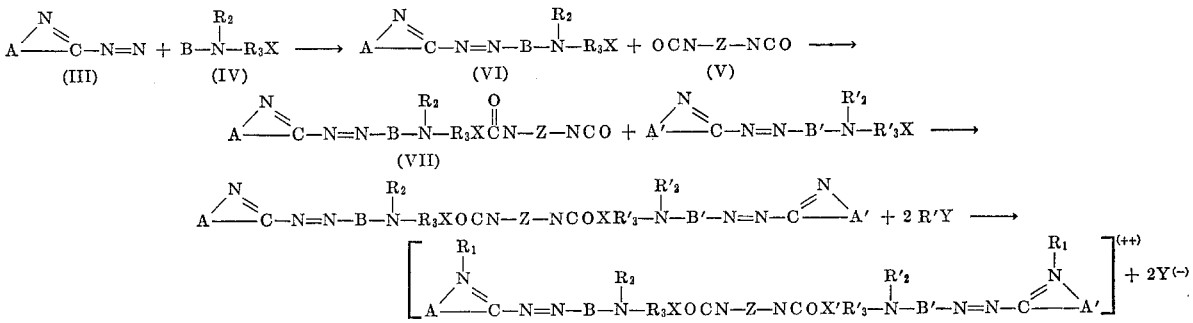

The following examples will serve to illustrate the preparation of the couplers and formation of the dyes of the invention therefrom.

Preparation of the couplers.—Bis urea coupler (coupler No. 1)

A solution of 35.6 g. of N-ethyl-N-β-aminoethyl-m-toluidine in 80 ml. of benzene was added slowly to 17.4 g. of tolylene-2,4-diisocyanate in 20 ml. of benzene. After the addition was complete and the exothermic reaction had subsided, the solution was heated at reflux for three hours. It was then poured into 125 ml. of ethanol and allowed to stand. The crystalline product was filtered off, washed with ethanol and dried at room temperature to give 51 g. of white product melting at 155° C. after recrystallization from ethanol. Analysis for C and H indicated the compound of the following structure:

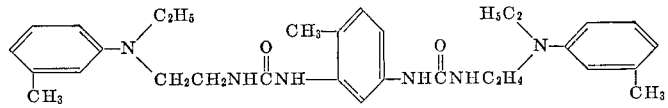

Bis urethane coupler (coupler No. 2)

A mixture of 33 g. of N-ethyl-N-β-hydroxyethylaniline, 17.4 g. tolylene-2,4-diisocyanate, and 100 ml. benzene was stirred and refluxed for 3 hours. While still hot, the solution was poured into a 250 ml. beaker and allowed to stand overnight at room temperature. The bis-urethane precipitated and was filtered off, washed with benzene, and dried. The yield was 40.9 g. of a white solid, M.P. 97–98° C. Analysis for C and H indicated the compound of the following structure:

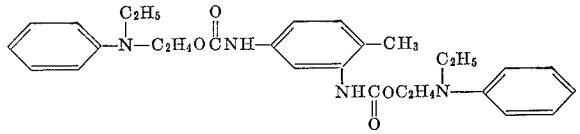

All of the couplers of Formula II used in the following examples were prepared in the manner described above using the appropriate diisocyanate of Formula V with two equivalents of the hydroxy or amino compound of Formula VI.

Preparation of symmetrical dyes

EXAMPLE 1

An amount of 1.5 g. of 2-aminobenzothiazole was dissolved in 58 g. of 50% H₂SO₄, cooled to 0° C. and treated with a solution of nitrosyl sulfuric acid prepared from .72 g. NaNO₂ and 5 ml. of H₂SO₄ (d. 1.84) at 0–5° C. The diazotization was completed by stirring at 3–6° C. for 2 hrs. This solution was added to an internally ice cooled solution of 2.51 g. of the bis urethane prepared from two equivalents of N-β-hydroxyethyl-N-ethyl-m-toluidine and tolylene-2,4-diisocyanate dissolved in dilute sulfuric acid. After 2 hrs. coupling the mineral acid was destroyed by addition of ammonium acetate and the coupling mixture was diluted to 800 ml. by addition of water. The precipitated dye was collected on a funnel, washed with water and dried at room temperature.

EXAMPLE 2

An amount of 0.5 g. of the dye of Example 1 was heated with 10 ml. of dimethyl sulfate at 90–95° C. for 1 hr. The blue solution was drowned in ether and the resulting solid collected on a funnel, washed with ether and dried in a vacuum desiccator. This dye imparts fast reddish-blue shades to Verel and Orlon 42. This dye has the following structure:

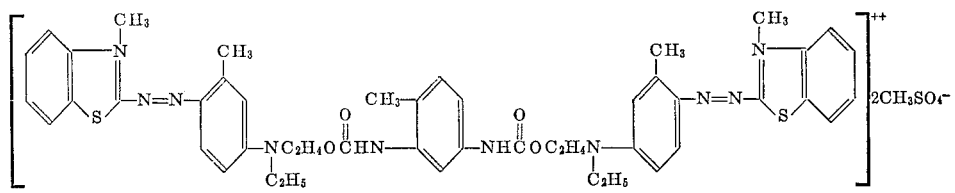

EXAMPLE 3

An amount of 10 ml. of 1:5 acid (1 part propionic:5 parts acetic acid) was added to a solution of nitrosyl sulfuric acid prepared from .72 g. of NaNO₂ and 5 ml. of H₂SO₄, below 20° C. Then, 1.76 g. of 2-amino-4-phenylthiazole was added portionwise below 5° C., followed by a second 10 ml. portion of 1:5 acid at the same temperature. After stirring for 2 hrs. at 3-5° C., the diazo solution was added to a solution of 2.65 g. of coupler No. 1 dissolved in 25 ml. of 1:5 acid cooled in an ice bath. The coupling mixture was neutralized to brown on Congo Red paper with ammonium acetate and allowed to stand for 2 hrs. with occasional stirring. The dye was isolated by drowning in 600 ml. water, filtering and washing with water.

EXAMPLE 4

An amount of 1 g. of the product of Example 3 was dissolved in 150 ml. of chlorobenzene and treated with 2 g. of methyl-p-toluene sulfonate in 10 ml. of chlorobenzene at 95-100° C. After 2 hr. at this temperature, the reaction mixture was cooled and the chlorobenzene was decanted from the slightly sticky product. A solution of 500 ml. of water containing a few ml. of acetic acid was added and the whole was heated on the steam bath until solution was attained. A small amount of charcoal was added and the bluish solution was filtered and allowed to cool. The dye was precipitated by addition of solid NaI, collected on a funnel, washed with about 50 ml. of water, and dried at room temperature. It dyes Verel and Orlon 42 in violet shades and has the following structure:

EXAMPLE 5

An amount of 0.5 g. of an azo dye prepared from coupling 2-diazo-5-methylthio-1, 3, 4-thiadiazole to the reaction product of two equivalents of N-β-hydroxyethyl-diphenylamine with p-xylylene diisocyante was heated with 10 g. of methyl-p-toluene sulfonate at 90-95° C. for 1.5 hr. The bluish solution was drowned in ether; the ether decanted from the precipitated quaternary dye and the latter dissolved in water by warming, filtered and allowed to cool. The dye was isolated by addition of $ZnCl_2$ and NaCl, filtering and washing with 5% NaCl solution. It dyes Verel and Orlon 42 in reddish blue shades. This dye has the structure:

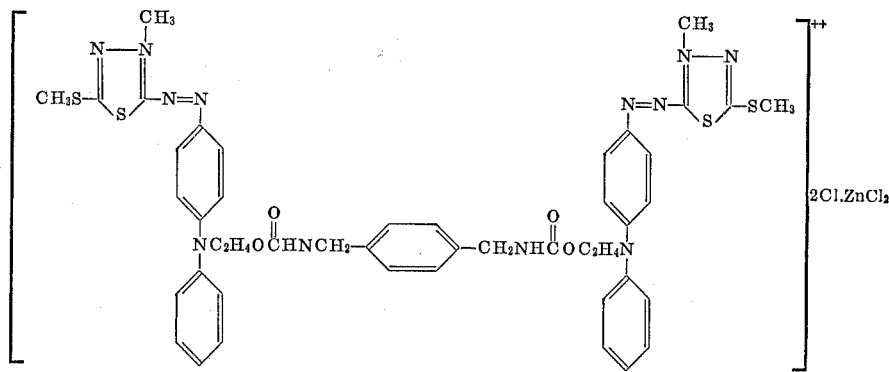

EXAMPLE 6

One gram of the zero dye prepared from the reaction of two equivalents of 2-diazo-1, 3, 4-triazole with the coupler prepared from the reaction of two equivalents of N-ethyl-N-β-hydroxyethylaniline with methylenebisphenylenediisocynate was heated in 10 ml. of dimethylsulfate for 1¾ hr. The red solution was poured into water and warmed until the excess dimethylsulfate had decomposed, charcoal was added and the solution filtered. Addition of potassium iodide to the cooled filtrate

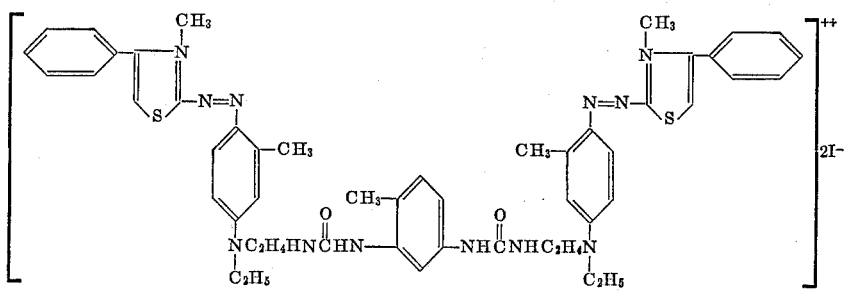

gave a dye which imparts red shades to acrylic fibers and has the formula

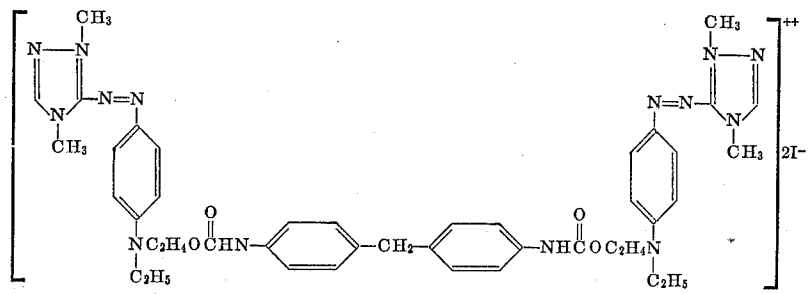

EXAMPLE 7

Five-tenths gram of the dye from 2-aminothiazola and the coupler prepared by reaction of 3, 3'-dimethylbisphenylene-4, 4'-diisocyanate with two equivalents of N, β-aminoethyl-N-ethyl-m-toluidine was heated in 5 ml. of methyl-p-toluenesulfonate for 3½ hr. The cooled solution was poured with stirring into 40 ml. of ether and the dye collected on a filter, washed with ether and dried in a vacuum desiccator. This dye imparts violet shades to acrylic fibers and has the structure:

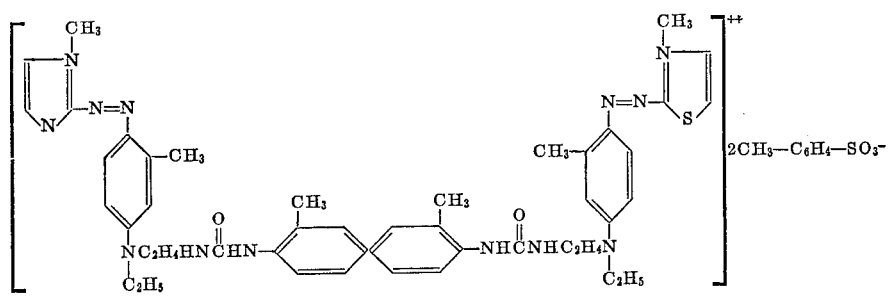

The dyes illustrated in the examples in Table I, below, were prepared in the manner described in the preceding examples. The column headings corresond to the structure of formula I, above. The table contains only the symetrical dyes. Thus, A=A', B=B', $R_2$=$R'_2$, $R_3$=$R'_3$.

Preparation of unsymmetrical dyes

EXAMPLE 13

An amount of 1.44 g. of the dye prepared from 2-aminothiazole and N-β-aminoethyl-N-ethyl-m-toluidine was dissolved in 50 ml. of dry dimethlformamide containing 0.87 g. of tolylene diisocyanate. After stirring for 0.5 hr. at room temperature the reaction mixture was heated at 90–95° C. for 3 hr. Then a solution of 1.70 g. of the dye prepared from 2-aminobenzothiazole and N-β-aminoethyl-N-ethyl-m-toluidine in 50 ml. of dry dimethylformamide was added. After heating and stirring for 72 hr., the red solution was drowned in water and the solid product was isolated and dried. It was heated in 20 ml. of dimethylsulfate at 95–100° C. for 1.5 hr., drowned in ether and the blue solid collected on a funnel, washed with ether and dried in a vacuum desic-

TABLE I

| Example Number | A | B | $R_2$ | $R_3$ | X | Z | Color on Orlon 42 |
|---|---|---|---|---|---|---|---|
| 8 | CH₃O—⟨⟩—⟨S⟩ | —⟨⟩—CH₃ | —$C_2H_5$ | —$C_2H_4$ | O | ⟨⟩—CH₃ | Blue. |
| 9 | ⟨⟩—⟨N(CH₃)⟩ | —⟨⟩—CH₃ | —$C_2H_5$ | —$C_2H_4$ | NH | —⟨⟩— | Violet. |
| 10 | ⟨⟩—⟨S⟩ | —⟨⟩—CH₃ | —$C_2H_5$ | —$C_2H_4$ | NH | ⟨⟩⟨⟩ (naphthyl) | Do. |
| 11 | N=HC—S | —⟨⟩— | —$C_2H_5$ | —$CH_2$—$CH(CH_3)$— | O | ⟨⟩—CH₃ | Blue. |
| 12 | ⟨⟩—⟨S⟩ | —⟨⟩— | —$C_2H_5$ | —$CH_2$—$CH(CH_3)$— | O | —$(CH_2)_6$— | Do. | cator. This dye imparts fast reddish-blue shades to Orlon and Verel. It has the structure:

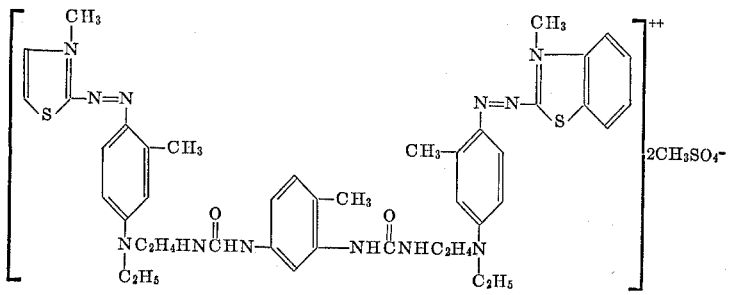

EXAMPLE 14

Following the procedure of Example 13 and using identical quantities of reagents, the diisocyante was replaced by p-xylylene diisocyanate. The dye obtained imparts fast reddish-blue shades to Orlon and Verel. It has the structure:

The dyes illustrated in the Table II, below, were prepared in the manner described in Example 13. The column headings correspond to the structures of the dyes of Formula I, above. The table contains only unsymmetrical dyes.

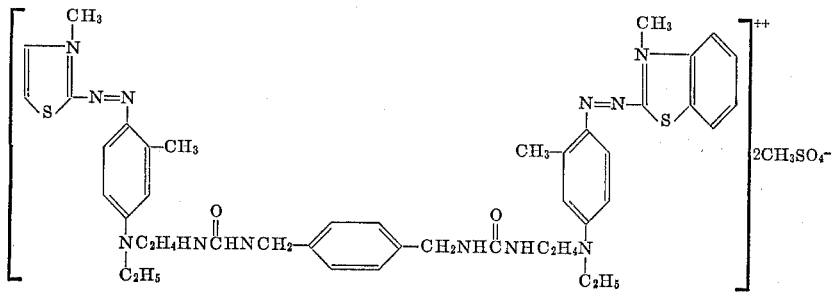

TABLE II

| Example Number | A | A' | $R_1$ | $R_2$ | $R'_2$ | $R_3$ | $R'_3$ |
|---|---|---|---|---|---|---|---|
| 15 | HC=HC-X (thiazole) | N=HC-N(CH₃)(CH₃) | $CH_3$ | $-C_2H_5$ | $-C_2H_5$ | $-C_2H_4-$ | $-C_2H_4-$ |
| 16 | CH₃-C=HC-S | CH₃-C=HC-S | $CH_3$ | $-C_2H_5$ | $-C_2H_5$ | $-C_2H_4-$ | $-C_2H_4-$ |
| 17 | HC=HC-S | benzo-N(CH₃) | $CH_3$ | phenyl | $-C_2H_5$ | $-C_2H_4-$ | $-C_2H_4-$ |
| 18 | N=HC-S | N=C(SCH₃)-S | $CH_3$ | $-C_2H_5$ | $-C_2H_5$ | $-C_2H_4-$ | $-C_2H_4-$ |
| 19 | benzo-S | CH₃O-benzo-S | $CH_3$ | $-C_2H_4CN$ | $-C_2H_5$ | $-C_2H_4-$ | $-C_2H_4-$ |

TABLE II—Continued

| Example Number | B | B' | X | X' | Z | Shade on Orlon |
|---|---|---|---|---|---|---|
| 15 | -C₆H₃(CH₃)- | -C₆H₃(CH₃)- | NH | NH | -C₆H₄- | Red-violet. |
| 16 | -C₆H₃(CH₃)- | -C₆H₃(CH₃)- | NH | O | -CH₂-C₆H₄-CH₂- | Violet. |
| 17 | -C₆H₄- | -C₆H₃(CH₃)- | O | NH | -C₆H₃(CH₃)- | Do. |
| 18 | -C₆H₃(CH₃)- | -C₆H₃(CH₃)- | NH | NH | -CH₂-C₆H₄-CH₂- | Do. |
| 19 | -C₆H₄- | -C₆H₃(CH₃)- | O | NH | -C₆H₃(CH₃)- | Blue. |

The cationic heterocyclic azo dyes of the invention can be used for dyeing materials including synthetic polymer fibers, yarns and fabrics giving a variety of fast shades including blue, red, and violet when applied thereto by conventional dye methods. In general, the dyes have improved fastness, for example, to washing, gas (atmospheric fumes) and sublimation.

As described above, the present cationic heterocyclic azo dyes are characterized by a structure which is distinct from other known dyes. This distinctive structure imparts unexpected properties to the present dyes, especially when they are used for dyeing textiles, including improved brightness and fastness to light. Thus, the dyes of the invention can be expected to be superior to similar but distinct dyes when tested by methods such as described in the A.A.T.C.C. Technical Manual, 1964 edition, depending in part upon the particular dye used and the fiber being dyed.

Textile materials dyed by the cationic heterocyclic azo dyes of the invention are characterized by containing at least about 35% combined acrylonitrile units and up to about 95% acrylonitrile units, and modified, for example, by 85–5% of vinyl pyridine units as described in U.S. Patents 2,990,393 (Re. 25,533) and 3,014,008 (Re. 25,539) or modified by 65–5% of vinylpyrrolidone units, for example, as described by U.S. Patent 2,970,783, or modified with 65–5% acrylic ester or acrylamide units as described in U.S. Patents 2,879,253, 2,879,254 and 2,838,470. Similar amounts of the other polymeric modifiers mentioned above are also useful. A preferred group of the copolymers readily dyeable with the dyes of the invention are the modacrylic polymers such as described in U.S. Patent 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

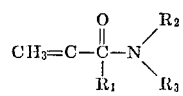

wherein $R_1$ is selected from the group consisting of hydrogen and methyl, and $R_2$ and $R_3$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

A particularly efficacious group of modacrylic polymers is an acetone soluble mixture of (A) 70–95% by weight of a copolymer of 30–65% by weight of vinylidene chloride and 70–35% by weight of acylonitrile and (B) 30–5% by weight of an acrylamide homopolymer having the above formula wherein $R_1$, $R_2$ and $R_3$ are as described above. Specific polymers of that group contain 70–95% by weight of (A) a copolymer of from 30–65% by weight of vinylidene chloride and 70–35% by weight of acrylonitrile and (B) 30–5% by weight of a lower N-alkylacrylamide polymer such as poly-N-methacrylamide, poly-N-isopropylacrylamide and poly-N-tertiarybutylacrylamide.

The following example illustrates one way in which the cationic heterocyclic azo dyes of the invention can be used to dye acrylonitrile polymer textile material. An amount of 0.1 gram of dye is dissolved by warming in 5 cc. of methyl Cellosolve. A 2% aqueous solution of a non-ionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber is entered and, in the case of Orlon 42, the dyeing is carried out at the boil for one hour. In the case of materials made of Verel acrylic fiber the dyebath temperature should not exceed 90° C. in order to avoid damage to the fiber. The dyed material is then washed well with water and dried.

The invention has been described in considerable detail with particular reference to certain preferred embodiments thereof, but it will be understood that variations and modifications can be effected within the spirit and scope of the invention as described hereinabove, and as defined in the appended claims.

What we claim is:
1. A compound having the formula

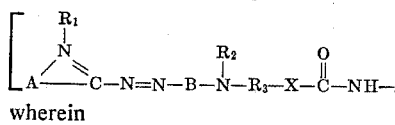

wherein

represents a heterocyclic group having the formula

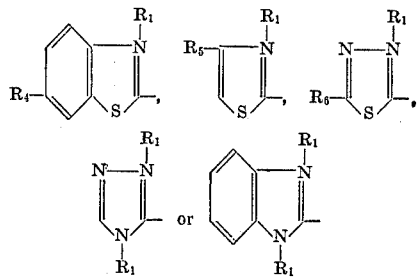

wherein
- $R_1$ is lower alkyl or benzyl;
- $R_4$ is hydrogen or methoxy;
- $R_5$ is hydrogen, methyl, or phenyl; and
- $R_6$ is hydrogen or methylthio;

B and B' each is p-phenylene or methyl-p-phenylene;

$R_2$ and $R'_2$ each is methyl, ethyl, 2-cyanoethyl, phenyl, or tolyl;

$R_3$ and $R'_3$ each is lower alkylene;

X and X' each is —O— or —NH—;

Z is alkylene of up to 6 carbon atoms, phenylene, methylphenylene, bis(phenylene)methylene, biphenylylene, dimethylbiphenylylene, bis(methylene)phenylene, or naphthylene; and Y is an anion.

2. A compound according to claim 1 wherein

represents a heterocyclic group having the formula

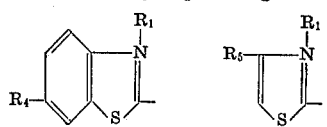

wherein
- $R_1$ is lower alkyl;
- $R_4$ is hydrogen or methoxy; and
- $R_5$ is hydrogen, methyl, or phenyl;

$R_3$ and $R'_3$ each is ethylene;

X and X' each is —NH—; and

Z is phenylene, methylphenylene, bis(methylene)-phenylene, or bis(phenylene)methylene.

3. The compound

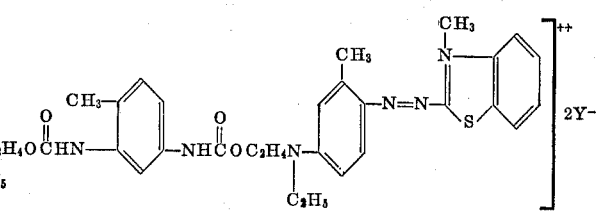

wherein
Y is an anion.

4. The compound

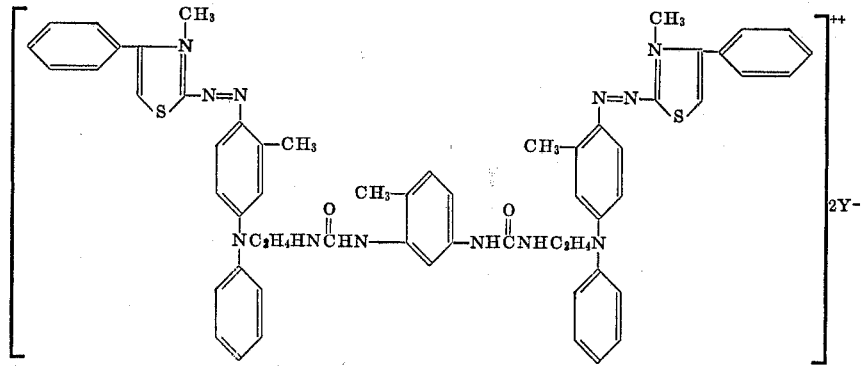

wherein
Y is an anion.

5. The compound

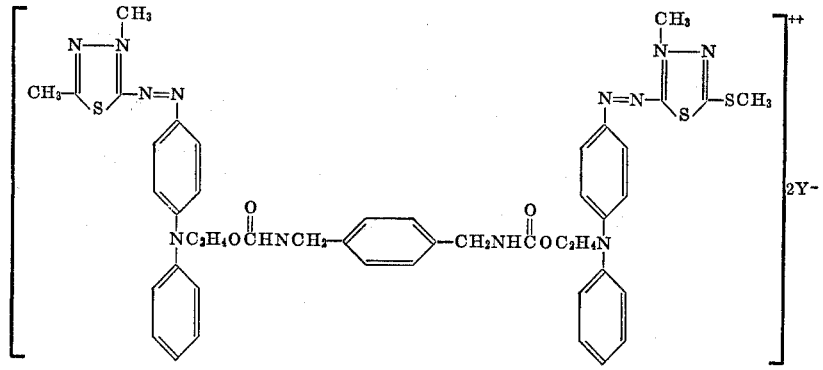

wherein
 Y is an anion.
6. The compound
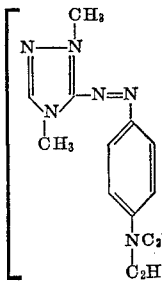
wherein
 Y is an anion.
7. The compound
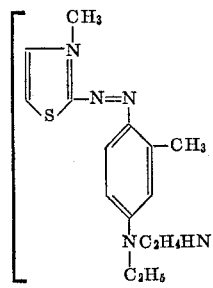
wherein
 Y is an anion.
8. The compound
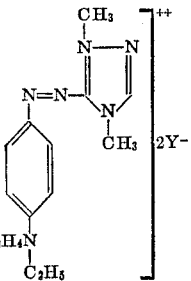
wherein
 Y is an anion.
9. The compound
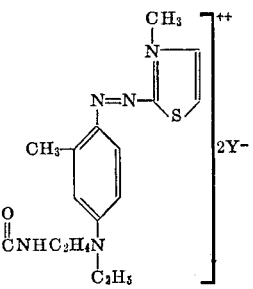
wherein
 Y is an anion.
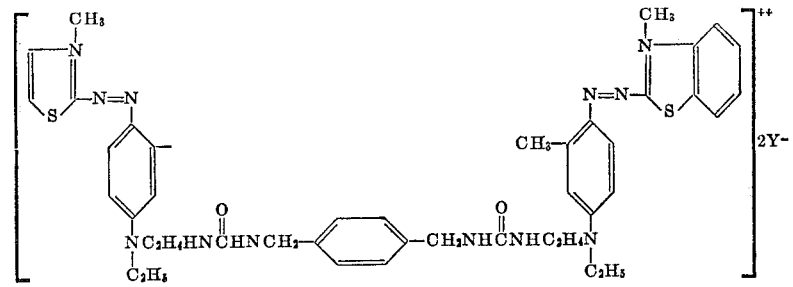
wherein
 Y is an anion.
References Cited
UNITED STATES PATENTS
3,271,383  9/1966  Yamaya et al. _____ 260—158
CHARLES B. PARKER, *Primary Examiner.*
D. M. PAPUGA, *Assistant Examiner.*
U.S. Cl. X.R.
260—157, 146, 37, 141, 553, 472; 117—138.8; 8—41, 55, 4